(12) United States Patent
Lachwani et al.

(10) Patent No.: US 9,367,415 B1
(45) Date of Patent: Jun. 14, 2016

(54) SYSTEM FOR TESTING MARKUP LANGUAGE APPLICATIONS ON A DEVICE

(71) Applicant: Google Inc., Mountain View, CA (US)

(72) Inventors: Manish Lachwani, Sunnyvale, CA (US); Jay Srinivasan, San Francisco, CA (US); Pratyus Patnaik, San Francisco, CA (US)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 14/159,402

(22) Filed: Jan. 20, 2014

(51) Int. Cl.
G06F 3/00 (2006.01)
G06F 11/22 (2006.01)
G06F 11/36 (2006.01)

(52) U.S. Cl.
CPC .......... *G06F 11/2294* (2013.01); *G06F 11/362* (2013.01)

(58) Field of Classification Search
None
See application file for complete search history.

(56) References Cited

U.S. PATENT DOCUMENTS

| | | | |
|---|---|---|---|
| 4,953,084 A | 8/1990 | Meloy et al. | |
| 6,131,188 A | 10/2000 | Goebel | |
| 6,145,122 A | 11/2000 | Miller et al. | |
| 6,151,701 A | 11/2000 | Humphreys et al. | |
| 6,430,624 B1 * | 8/2002 | Jamtgaard | G06F 17/30899 707/E17.119 |
| 6,598,221 B1 | 7/2003 | Pegatoquet et al. | |
| 6,829,733 B2 | 12/2004 | Richardson et al. | |
| 7,051,238 B2 | 5/2006 | Gardner et al. | |
| 7,197,744 B2 * | 3/2007 | Hostettler | G06F 8/33 717/125 |
| 7,418,697 B2 | 8/2008 | Gryko et al. | |
| 7,805,707 B2 | 9/2010 | Pouliot | |
| 7,870,540 B2 | 1/2011 | Zare et al. | |
| 7,991,747 B1 | 8/2011 | Upadhyay et al. | |
| 8,370,810 B2 | 2/2013 | Oda | |
| 8,479,166 B2 | 7/2013 | Nir-Buchbinder et al. | |
| 8,504,987 B2 | 8/2013 | Li et al. | |
| 8,671,080 B1 | 3/2014 | Upadhyay et al. | |
| 9,037,735 B1 * | 5/2015 | Fallows | H04L 67/42 709/228 |
| 9,268,668 B1 * | 2/2016 | Lachwani | G06F 11/3664 |
| 2002/0010710 A1 | 1/2002 | Binnig | |
| 2002/0040470 A1 | 4/2002 | Guthrie et al. | |

(Continued)

OTHER PUBLICATIONS

Pyzocha, "Non Final Office Action dated Sep. 9, 2014", U.S. Appl. No. 13/655,667, The United States Patent and Trademark Office, Sep. 9, 2014.

(Continued)

*Primary Examiner* — Hua Lu
(74) *Attorney, Agent, or Firm* — McDonnell Boehnen Hulbert & Berghoff LLP

(57) ABSTRACT

A system is described for testing markup language-based applications, such as a web page, executing on an external computing device. A development device executes development tool modules which may include a proxy module and a driver module. The proxy module enables communication between one or more modules which execute on the development device and one or more embedded test tools on the computing device. The driver module provides a command line interface to facilitate automated testing, and generates commands appropriate to the use of the embedded test tools and may use the proxy module to communicate with the computing device. Using the proxy module, the driver module, or both, a developer is able to test and interact with a markup language application executing on the computing device with a variety of development modules.

20 Claims, 9 Drawing Sheets

(56) References Cited

U.S. PATENT DOCUMENTS

| | | | |
|---|---|---|---|
| 2002/0166081 A1 | 11/2002 | Richardson et al. | |
| 2003/0221184 A1 | 11/2003 | Gunjal et al. | |
| 2004/0010778 A1* | 1/2004 | Kaler | G06F 11/362 717/130 |
| 2004/0194072 A1 | 9/2004 | Venter | |
| 2005/0273776 A1 | 12/2005 | Guilford | |
| 2005/0278707 A1 | 12/2005 | Guilford | |
| 2006/0059253 A1 | 3/2006 | Goodman et al. | |
| 2006/0242709 A1 | 10/2006 | Seinfeld et al. | |
| 2007/0271282 A1* | 11/2007 | Boren | G06F 8/34 707/999.1 |
| 2007/0288644 A1 | 12/2007 | Rojas et al. | |
| 2009/0150420 A1 | 6/2009 | Towner | |
| 2011/0047597 A1 | 2/2011 | Mahaffey et al. | |
| 2011/0060751 A1* | 3/2011 | English | G06F 17/30746 707/758 |
| 2011/0078663 A1* | 3/2011 | Huang | G06F 17/30876 717/126 |
| 2011/0289483 A1 | 11/2011 | Williams et al. | |
| 2012/0260344 A1 | 10/2012 | Maor et al. | |
| 2013/0047256 A1* | 2/2013 | Man | G06F 21/53 726/24 |
| 2013/0060890 A1 | 3/2013 | Lee et al. | |
| 2013/0152047 A1 | 6/2013 | Moorthi et al. | |
| 2013/0185798 A1 | 7/2013 | Saunders et al. | |
| 2013/0227636 A1 | 8/2013 | Bettini et al. | |
| 2013/0276061 A1 | 10/2013 | Chebiyyam et al. | |
| 2013/0282892 A1 | 10/2013 | Levi et al. | |
| 2013/0305222 A1* | 11/2013 | Cinar | G06F 8/30 717/124 |
| 2014/0020096 A1 | 1/2014 | Khan et al. | |
| 2014/0035945 A1* | 2/2014 | Anglin | G06F 3/14 345/619 |
| 2014/0047413 A1* | 2/2014 | Sheive | H04L 65/403 717/110 |
| 2014/0082729 A1 | 3/2014 | Shim et al. | |
| 2014/0380137 A1* | 12/2014 | Zhang | G06F 17/30905 715/202 |

OTHER PUBLICATIONS

Seo, et al., "Analysis on maliciousness for mobile applications", 2012 Sixth International Conference on Innovative Mobile and Internet Services in Ubiquitous Computing, IEEE, 2012, pp. 126-129.

"Debugserver", [online] [retrieved on Apr. 22, 2014] Retrieved from the Internet: <http://iphonedevwiki.net/index.php/Debugserver>.

Chowdhury, "Non Final Office Action dated Feb. 13, 2014", U.S. Appl. No. 13/631,919, The United States Patent and Trademark Office, Feb. 13, 2014.

LLDB.LLVM.org, "The LLDB Debugger", [online] [retrieved Apr. 22, 2014] Retrieved from the Internet: <http://lldb.llvm.org/>.

Charles Lu, "Debug Java applications remotely with Eclipse", developerWorks, IBM, Dec. 9, 2008, [online] [retrieved on Apr. 22, 2014] Retrieved from the Internet: <http://www.ibm.com/developerworks/library/os-eclipse-javadebug/index.html>.

Javin Paul, "How to setup Java remote debugging in Eclipse", Javarevisited-Blog about Java programming language, FIX Protocol, Tibco Rendezvous and related Java technology stack, Feb. 25, 2011, [online] [retrieved Apr. 22, 2014] Retrieved from the Internet: <http://javarevisited.blogspot.com/2011/02/how-to-setup-remote-debugging-in.html>.

Pyzocha, "Non Final Office Action dated May 13, 2014", U.S. Appl. No. 13/655,667, The United States Patent and Trademark Office, May 13, 2014.

Bakos, et al., "Lightweight Error Correction Coding for System-Level Interconnects", IEEE Transactions on Computers, vol. 56, No. 3, Mar. 2007, pp. 1-16 [online], [retrieved on Jul. 2, 2014]. Retrieved from the Internet <URL:http://kona.ee.pitt.edu/steve/Recen%20Publications/TC_2007_TC-0414-1105-1.pdf>.

Chowdhury, "Notice of Allowance dated Jul. 2, 2014", U.S. Appl. No. 13/631,919, The United States Patent and Trademark Office, Jul. 2, 2014.

Coyer, "Non Final Office Action dated Jun. 5, 2014", U.S. Appl. No. 13/721,632, The United States Patent and Trademark Office, Jun. 5, 2014.

Dearle, "Software Deployment, Past, Present and Future", IEEE 2007, pp. 1-16 [online], [retrieved on Jul. 2, 2014]. Retrieved from the Internet <URL:http://www.cs.tufts.edu/comp/250SA/papers/dearle2007.pdf>.

Guglielmo, et al., "Model-Driven Design and Validation of Embedded Software", 2011 ACM, pp. 98-104 [online], [retrieved on Jul. 2, 2014]. Retrieved from the Internet <URL:http://dbonline.igroupnet.com/ACM.TOOLS/Rawdata/Acm1106/fulltext/1990000/1982616/p98-guglielmo.pdf>.

Rueher, et al., "Capturing Software Processes Through the Generated Objects", 1988, pp. 148-152 [online], [retrieved on Jul. 2, 2014]. Retrieved from the Internet <URL:http://delivery.acm.org/10.1145/80000/75138/p148-rueher.pdf>.

* cited by examiner

SYSTEM FOR TESTING MARKUP LANGUAGE APPLICATIONS ON A DEVICE

BACKGROUND

With the growing popularity of computing devices, there is an increasing demand for applications, or apps, to run on such devices. These devices may include smartphones, tablet computers, televisions, set-top boxes, wearable devices, in-vehicle computer systems, home entertainment systems, embedded devices, and so forth. To satisfy this demand, programmers are constantly building, testing, and maintaining applications. Testing of these applications is useful for quality assurance to find and correct errors.

Figure 1:
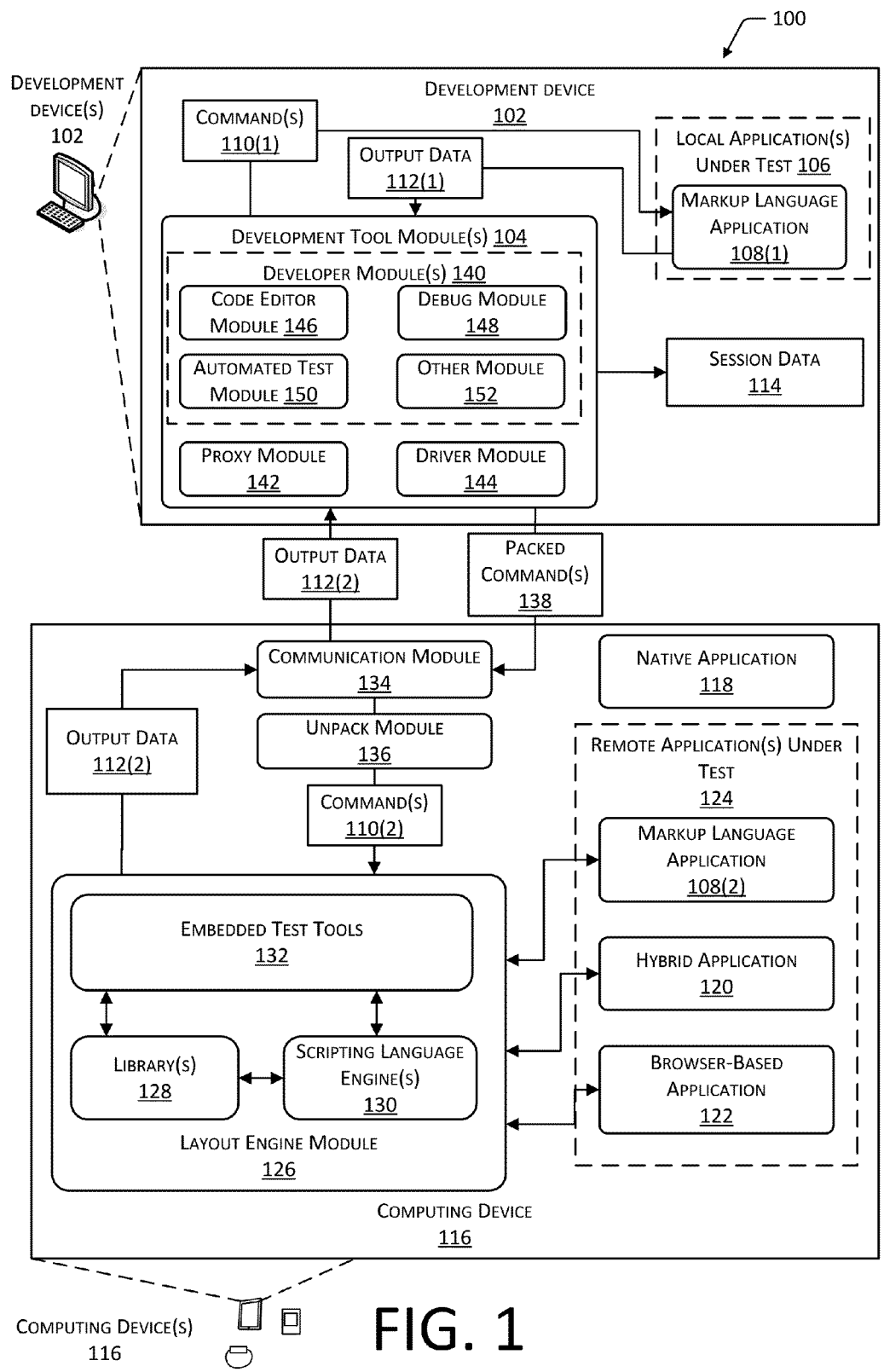
FIG. 1 depicts an environment having a development device for testing markup language applications executing on a remote computing device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

INCORPORATION BY REFERENCE

The following applications are incorporated by reference.

U.S. patent application Ser. No. 13/619,867, filed on Sep. 14, 2012, titled "Remote Control of a Mobile Device" to Manish Lachwani, et al. is incorporated by reference into this disclosure.

U.S. patent application Ser. No. 13/680,671, filed on Nov. 19, 2012, titled "Configurable Network Virtualization" to Manish Lachwani, et al. is incorporated by reference into this disclosure.

U.S. patent application Ser. No. 13/631,919, filed on Sep. 29, 2012, titled "Application Validation Through Object Level Hierarchy Analysis" to Manish Lachwani, et al. is incorporated by reference into this disclosure.

U.S. patent application Ser. No. 13/655,667, filed on Oct. 19, 2012, titled "Application Auditing Through Object Level Code Inspection" to Manish Lachwani, et al. is incorporated by reference into this disclosure.

U.S. patent application Ser. No. 13/721,632, filed on Dec. 20, 2012, titled "System For Testing Markup Language Applications" to Manish Lachwani, et al. is incorporated by reference into this disclosure.

U.S. patent application Ser. No. 13/741,989, filed on Jan. 15, 2013, titled "Application Testing System With Application Programming Interface" to Manish Lachwani, et al. is incorporated by reference into this disclosure.

U.S. patent application Ser. No. 13/862,240, filed on Apr. 12, 2013, titled "Test Automation API For Host Devices" to Manish Lachwani, et al. is incorporated by reference into this disclosure.

U.S. patent application Ser. No. 13/868,560, filed on Apr. 23, 2013, titled "Test Script Generation" to Manish Lachwani, et al. is incorporated by reference into this disclosure.

U.S. patent application Ser. No. 13/962,662, filed on Aug. 8, 2013, titled "Application Testing System" to Manish Lachwani, et al. is incorporated by reference into this disclosure.

U.S. patent application Ser. No. 14/050,071, filed on Oct. 9, 2013, titled "Performance Data Collection" to Manish Lachwani, et al. is incorporated by reference into this disclosure.

DETAILED DESCRIPTION

A wide variety of applications or apps are developed for execution on computing devices including smartphones, tablet computers, televisions, set-top boxes, wearable devices, in-vehicle computer systems, home entertainment systems, and so forth. Some of these devices are mobile devices, in that they are portable from one location to another.

There is an increasing demand for software developers to build applications, or apps, to run on such devices. Software developers build, test, and maintain applications using a variety of development tools. Testing provides many benefits including finding and correcting errors, improving performance, and so forth. Testing may include observing processor usage, observing memory allocation, programmatic debugging, determining usability, validating functionality, and so forth.

Different types of applications may be available for use on the computing devices. These include native applications, markup language applications, hybrid applications, and browser-based applications. Native applications are those which are written and compiled for execution on the particular device. For example, native applications may be written in a programming language such as C++ or Objective C and compiled into native code such as a binary executable for use on the device. Markup language applications include one or more instructions in a markup language which may be rendered by a layout engine and one or more instructions in a scripting language which may be interpreted by a scripting language engine during execution. For example, a hypertext markup language ("HTML") version 5 (or higher) markup language application may include HTML, cascading style sheets ("CSS"), and JavaScript. In some implementations the markup language application may have multiple instances of the UIWebView class references. Hybrid applications include native code and markup language application portions. Browser-based applications are processed within a web browser application and are limited in execution. The browser-based applications may have one or more UIWebView instances.

Markup language applications confer several advantages including, in particular, ease of deployment across different devices with no adjustment or minimal adjustment. For example, a markup language application for a smartphone from one manufacturer may also be executed on an in-vehicle system. In comparison, a native application may need to be re-coded, recompiled, and so forth to operate on different platforms. The platforms may be distinguished by different processors, operating systems, or combinations thereof. In some implementations, the markup language application may be provided as one or more web pages. For example, the markup language application may comprise the set of HTML5, CSS, JavaScript, and so forth which may be accessible by way of a network address. The network address may comprise a uniform resource locator (URL), uniform resource identifier (URI), internet protocol address, and so forth.

Traditional testing systems have lacked the ability to provide development tools for testing for markup language applications executing on computing devices. Software developers (developers) have had to rely on cumbersome methods for testing, including insertion of debug code, use of simulators, and so forth. The insertion of debug code, such as found in a software development kit ("SDK"), or manual breakpoints requires ongoing editing and adjustment of the code, and may result in incorrect or missed information. Likewise, the simulators lack the full fidelity provided by execution on the actual computing device.

Furthermore, developers may wish to use a particular tool with which they are more familiar, or which includes additional functionality, but which the computing device which will be executing the application to be tested may not natively support the particular tool. For example, a developer may prefer the set of features and interface associated with the Chrome™ Development Tools, also known as "DevTools" as promulgated by Google Inc. of Mountain View, Calif. Traditionally, the developer has been unable to use these Chrome™ DevTools to debug a markup language application which is executing on a computing device which is executing the iOS® operating system from Apple Corp. of Cupertino, Calif. Instead, the developer would need to use those tools specifically provided by Apple Corp., such as the Safari® Inspector to debug a markup language application executing on the iOS® operating system. As a result, developers may be frustrated in their development efforts.

This disclosure describes embodiments of systems and methods for testing markup language applications executing on an actual computing device, a simulation of a computing device, or both. A development device such as a desktop computer may execute one or more development tools such as debuggers, memory debuggers, and so forth. These development tools may be used to test markup language applications which are either local to the development device or which are remote, such as those executing on the computing device. In one implementation the development tools may include the Safari® Inspector as developed by Apple Corp. of Cupertino, Calif., Chrome™ Developer Tools as developed by Google Inc. of Mountain View, Calif., and so forth.

A proxy module is configured to provide communication between the development tools of the development device and embedded test tools which are present on the computing device. The proxy module allows for the use of the development tools to interact with an application under test and the modules which support execution thereof. These embedded test tools may be incorporated into other modules, such as a layout engine module. The layout engine module is configured to execute an application or portion thereof which uses a markup language, such as hypertext markup language (HTML) version 5 or higher. In one implementation the layout engine module may comprise WebKit® as promulgated by Apple Corp. or others through an open source development model.

In some implementations the proxy module may be configured to provide an interface with one or more ports which is WebSocket-compatible. For example, the proxy module may provide a first set of one or more WebSockets which are available to communicate with the developer tools, and a second set of one or more WebSockets which are available to communicate with services or modules executing on the computing device. In some implementations, the WebSocket protocol may be compliant with the Internet Engineering Task Force (IETF) Request For Comments (RFC) 6455, also known as RFC 6455.

In some implementations a developer may choose to use development tools which may be otherwise incompatible with the layout engine module or the embedded test tools. For example, a developer may choose to use the Google Chrome™ DevTools to debug a web site which is rendered in the Mobile Safari® browser executing on the computing device running the Apple iOS® operating system. In this example, the Google Chrome™ DevTools use the Google Inc. remote debugging protocol, however the WebKit® portion of the layout engine module may be unable to process inputs made using the remote debugging protocol.

A driver module may be employed to accept one or more commands in a first form and output one or more commands in a second form. Continuing the earlier example, the driver module may accept remote debugging protocol inputs from DevTools, command line inputs, and so forth, and provide outputs which are compatible with WebKit®. The driver module may be configured to accept manual inputs, scripted input, programmatically generated inputs, and so forth. For example, the driver module may be configured to accept, as input, commands included in test script data. In some implementations the driver module may use WebSockets to exchange information with other modules such as the developer tools, proxy module, and so forth.

With the proxy module and the driver module, developers may use a wide variety of tools to develop applications which incorporate markup language. As described above, a developer may use the Chrome™ DevTools to debug a web page as rendered by the Apple Mobile Safari® browser executing on the iOS® operating system.

The techniques and modules described above may be performed using a computing device which is in the secured configuration, such as a default operating system which has not been "jailbroken". In this secured configuration access to the operating system on the computing device, file system, and so forth may be restricted.

By eliminating the need for insertion of debugging code and the associated effort involved, overall productivity and effectiveness of the software development effort is improved. For example by using the proxy module, the developer may debug a markup language application on the computing device using existing on-board (previously loaded) embedded test tools, such as the Apple Safari® web inspector "com.apple.webinspectord". Finally, the use of the actual computing device during testing provides the highest fidelity testing available which is representative of the end-user experience, which may improve quality of the application as released to the end user.

Illustrative Environment

FIG. 1 depicts an environment 100 for testing markup language applications executing on a remote or external computing device. In some implementations, the techniques described herein may be used to test markup language applications executing on a simulated computed device.

A development device 102 is depicted. The development device 102 is configured to execute, at least in part, one or more development tool modules 104. The development tool module 104 provides applications for testing, debugging, runtime editing of the application being tested, and so forth. The development tool module 104 may include the Safari® Inspector as developed by Apple Corp., the GNU debugger ("gdb") as maintained by the GDB Steering Committee, Google Developer Tools (DevTools) as promulgated by Google, Inc., and so forth. The development tool modules 104 are discussed in more detail elsewhere in this application.

The development device 102 may be used to test one or more local applications under test 106. This local application under test 106 includes a markup language application 108. The development tool module 104 may be configured to provide testing of the local application under test 106. This testing may include the development tool module 104 providing one or more commands 110 to a local layout engine module (not depicted here). The local layout engine module is configured to execute or interpret the markup language application 108, and return output data 112. The output data 112 may include crash dumps, register values, memory information, timing data, hardware resource usage data, and so forth.

In one implementation the layout engine module may comprise WebKit® as promulgated by Apple Corp. and others. In this implementation, the commands 110 may be debugging commands compatible with the WebKit® layout engine and internal components such as the WebCore, JSCore, and so forth. For example, commands may be deemed "compatible" when such commands are operable to be processed by a module to change state, change operation, and so forth.

In this illustration, the development tool module 104 is providing commands 110(1) to the markup language application 108(1) which is local to the development device 102. The development tool module 104 may receive the output data 112(1) resulting from the execution of the markup language application 108(1) by the local layout engine module.

The development tool module 104 may provide session data 114. The session data 114 may be stored in a JavaScript Object Notation (JSON) format. The session data 114 may include data based at least in part on the commands 110, the output data 112, and so forth. The session data 114 may be saved for later analysis, sent to another device, and so forth. In some implementations, the development tool module 104 may be configured to replay previously stored session data 114. The development device 102 is described in more detail elsewhere in this application, such as in regard to FIG. 3.

As described above, testing using a particular computing device platform provides valuable information which is useful to the software developer and others. One or more computing devices 116 may be coupled to the development device 102. This coupling enables the development tool module 104 of the development device 102 to test a markup language application 108(2) on the computing device 116. Because of the coupling and testing facilities made available through the development tool module 104, debug code or other testing instructions may be omitted from a remote application under test 124.

The computing device 116 may include a native application 118, the markup language application 108, a hybrid application 120, a browser-based application 122, or a combination thereof.

The native application 118 is written and compiled for execution on the particular computing device 116 platform. For example, native applications may be written in a programming language such as C++ or Objective C and compiled into native code such as a binary executable for use on the device having a particular processor and operating system.

In comparison, markup language applications 108 include one or more instructions in a markup language which is rendered and a scripting language which is interpreted by a scripting language engine during execution. For example, a hypertext markup language ("HTML") version 5 (or higher) markup language application may include HTML and cascading style sheets ("CSS") as the markup language and JavaScript as the scripting language. In some implementations the markup language application 108 may have multiple instances of the UIWebView class references.

The hybrid applications 120 include native code as well as markup language application portions. For example, portions of native code may be used to interact with platform-specific hardware such as a graphics processing unit while portions of markup language provide business logic and user interface elements.

The browser-based applications 122 are processed within a web browser application and may be limited in their execution by the constraints of the web browser. The browser-based applications 122 may include rendering of a particular web page or group of web pages, such as expressed at least in part by a markup language, such as HTML5. The browser-based application 122 is executed within a particular sandbox and executes within the web browser. The browser-based applications may have only a single UIWebView instance. Browser-based applications 122 may be further constrained in that they may share caches and other resources with the web browser and also occupy the same sandbox as the web browser. Sandboxing and distinctions between the different applications are discussed elsewhere in this application, such as in regard to FIG. 2.

The computing device 116 may include one or more of the remote applications under test 124. These applications are "remote" or "external" in that they are executing on a different device from the development device 102 and the development tool module 104. The remote applications under test 124 may include the markup language application 108(2), the hybrid application 120, or both.

The remote applications under test 124 may use a layout engine module 126 during execution. In one implementation the layout engine module 126 may comprise WebKit® as promulgated by Apple Corp. and others. In this implementation, the commands 110 may comprise WebKit® commands.

The layout engine module 126 may include one or more libraries 128, scripting language engines 130, embedded test tools 132, and so forth. The libraries 128 may comprise previously stored program instructions which may be called by applications during execution. These libraries 128 may include those involved in layout, rendering, document object model ("DOM") creation, graphics libraries, and so forth. In one implementation the graphics libraries may include WebGL™ as promulgated by the Khronos Group of Beaverton, Oreg.

The scripting language engines 130 are configured to interpret and execute the scripting language portion of the markup language application 108 or the hybrid application 120. In the WebKit® implementation the scripting language engine 130 may comprise the JavaScript Core. Other scripting language engines 130 may also be present. For example, the Nitro JS engine provided by Apple Corp., the Carakan JavaScript engine provided by Opera Software of Oslo, Norway, and so forth may be available on the computing device 116 for use.

These may be regularly available on the computing device 116, or may be specifically loaded onto the computing device 116 for testing purposes.

The layout engine module 126 may include one or more of the embedded test tools 132. The embedded test tools 132 are functionalities in the layout engine module 126 which may be used for testing. The embedded test tools 132 may include facilities for runtime editing, providing memory allocation information, platform resource usage information, and so forth. The embedded test tools 132 are configured to interact with the scripting language engine 130 or other portions of the layout engine module 126. For example, in one implementation the embedded test tools 132 may comprise the Mobile Safari® web inspector, such as implemented by the "com.apple.webinspectord" service executing on a computing device 116 which uses the Apple iOS® operating system. The embedded test tools 132 may generate the output data 112. The embedded test tools 132 may be used in conjunction with the development tool module(s) 104 executing on the development device 102 to provide various testing capabilities to the software developer.

Communication between the development tool module 104 on the development device 102 and the layout engine module 126 may be provided in some implementations by a communication module 134 and an unpack module 136. The communication module 134 is configured to send and receive information to a device external to the computing device 116, such as the development device 102. The communication module 134 may use various physical transports to exchange information including universal serial bus ("USB"), Institute of Electrical and Electronics Engineers ("IEEE") 1394 "Firewire", wired Ethernet, wireless such as Wi-Fi or Bluetooth, and so forth. Transmission control protocol ("TCP"), user datagram protocol ("UDP") or other transport layer protocols may be used in conjunction with the physical transports to exchange information between the development device 102 and the computing device 116. In one implementation the physical transport may comprise USB and data may be sent using hypertext transport protocol ("HTTP") over TCP ("HTTP/TCP"), WebSockets, and so forth.

In one implementation, the communication module 134 may comprise a lightweight HTTP server. This server is configured to send and receive data, and is considered lightweight in that it executes with relatively small resource overhead and has a more limited feature set than that provided by a typical web server application, such as Apache HTTP server. For example, the communication module 134 may omit functions such as support for HTTP Secure ("HTTPS").

In another implementation, the communication module 134 may be configured to provide TCP over USB. For example, the communication module 134 may implement the "usbmuxd" daemon.

The communication module 134 may receive packed commands 138 from the development tool 104 of the development device 102. The commands 110 may be packetized or otherwise manipulated for transport between the development tool module 104 on the development device 102 and the computing device 116, forming the packed commands 138. The communication module 134 passes the received packed commands 138 to the unpack module 136.

The unpack module 136 is configured to process the packed commands 138 and provide unpacked commands 110(2) to the layout engine module 126. The processing may include removing transport-associated information such as headers, routing information, and so forth. For example, the unpack module 136 may remove TCP headers and reassemble payloads across multiple packets to form the commands 110(2). In some implementations the unpacked commands 110(2) may be in extensible markup language procedure call ("XPC") format.

The unpack module 136 provides the unpacked commands 110(2) to the layout engine module 126 for processing. The unpacked commands 110(2) are compatible with the embedded test tools 132 and other aspects of the layout engine module 126 and an associated framework. Just as the development tool module 104 may send commands 110(1) associated with the local application under test 106, the development tool module 104 may send commands 110(2) associated with the remote application under test 124. The layout engine module 126 may be configured to operate such that commands 110 are provided and responses such as the output data 112 are generated.

The development tool modules 104 may include one or more developer modules 140, a proxy module 142, and a driver module 144. The developer modules 140 may include code editor modules 146, debug modules 148, automated test modules 150, or other modules 152. The developer modules 140 may be configured to generate one or more commands 110. For example, generation may include creation of a command 110, replay of a previously stored command, and so forth. The code editor modules 146 may include tools for the developer to change the markup language expressions in the markup language application 108, perform runtime editing, and so forth. The debug modules 148 may provide for step by step execution, crash analysis, and so forth. The automated test modules 150 may allow for creation, editing, and playback of test script data which may be used to automate at least a portion of a testing regimen. Other modules 152 may provide other testing functionality. For example, a fuzzing module may be configured to generate inputs which may be applied to the markup language application 108 or another application under test. In one implementation the developer modules 140 may include one or more of the applications, libraries, executables, application programming interfaces (APIs), and so forth present in the Google DevTools as promulgated by Google, Inc. In some implementations the developer modules 140 may generate commands 110 which are compliant with at least a portion of the remote debugging protocol as promulgated by Google, Inc.

The proxy module 142 is configured to provide a communication proxy between the development tool modules 104 or the driver module 144 and modules executing on the computing device 116. For example, the proxy module 142 may provide for communication between a Chrome™ DevTool on the development device 102 and the web inspector daemon "com.apple.webinspectord" executing on the computing device 116. The proxy module 142 may encapsulate, pack, or otherwise process the commands 110 or other data for transfer. For example, in one implementation the proxy module 142 may generate packed commands 138 from the commands 110 provided by one or more of the developer modules 140.

The proxy module 142 may be configured to provide communications interfaces or ports. For example, the proxy module may provide a first set of one or more WebSockets which are available to communicate with the developer modules 140 and the driver module 144, and a second set of one or more WebSockets which are available to communicate with services or modules executing on the computing device 116. In some implementations, the WebSocket protocol may be compliant with the Internet Engineering Task Force RFC 6455.

The proxy module 142 may maintain multiple sessions or WebSocket ports for a single computing device 116. For example, in one implementation, a separate WebSocket port may be provided for each tab within a browser application executing on the computing device 116.

The driver module 144 is configured to receive commands 110 in a first form and convert those commands 110 to a second form. For example, the driver module 144 may receive commands 110 in a first form which is compatible with the remote debugging protocol and provide commands 110 which are compatible with the WebKit® of the layout engine module 126. Continuing the example, the command 110 may designate a URL to open and render within a web browser.

In some implementations the driver module 144 may be implemented using the Ruby programming language as developed by Yukihiro Matsumoto and described at www.ruby-lang.org. The driver module 144 may be used to provide a command line interface (CLI). The command line interface may accept commands manually, such as when the developer types them into the CLI, or may accept commands which have been previously written, such as from test script data.

Using the techniques described, a single development device 102 may perform testing using one or more computing devices 116. For example, the single development device 102 may be connected to, and performing testing using, four computing devices 116(1), 116(2), 116(3), and 116(4). The testing may be automated, allowing for long duration and more comprehensive tests across multiple devices, compared to testing on a single computing device 116 at a time.

The modules in this disclosure may be described as separate modules for ease of illustration, and not by way of limitation. For example, the communication module 134 and the unpack module 136 are described in this disclosure as separate modules. In some implementations at least a portion of the functionality of these modules may be combined into a single module, or incorporated into another module. The computing device 116 is described in more detail elsewhere in this application, such as in regard to FIG. 4.

Figure 2:
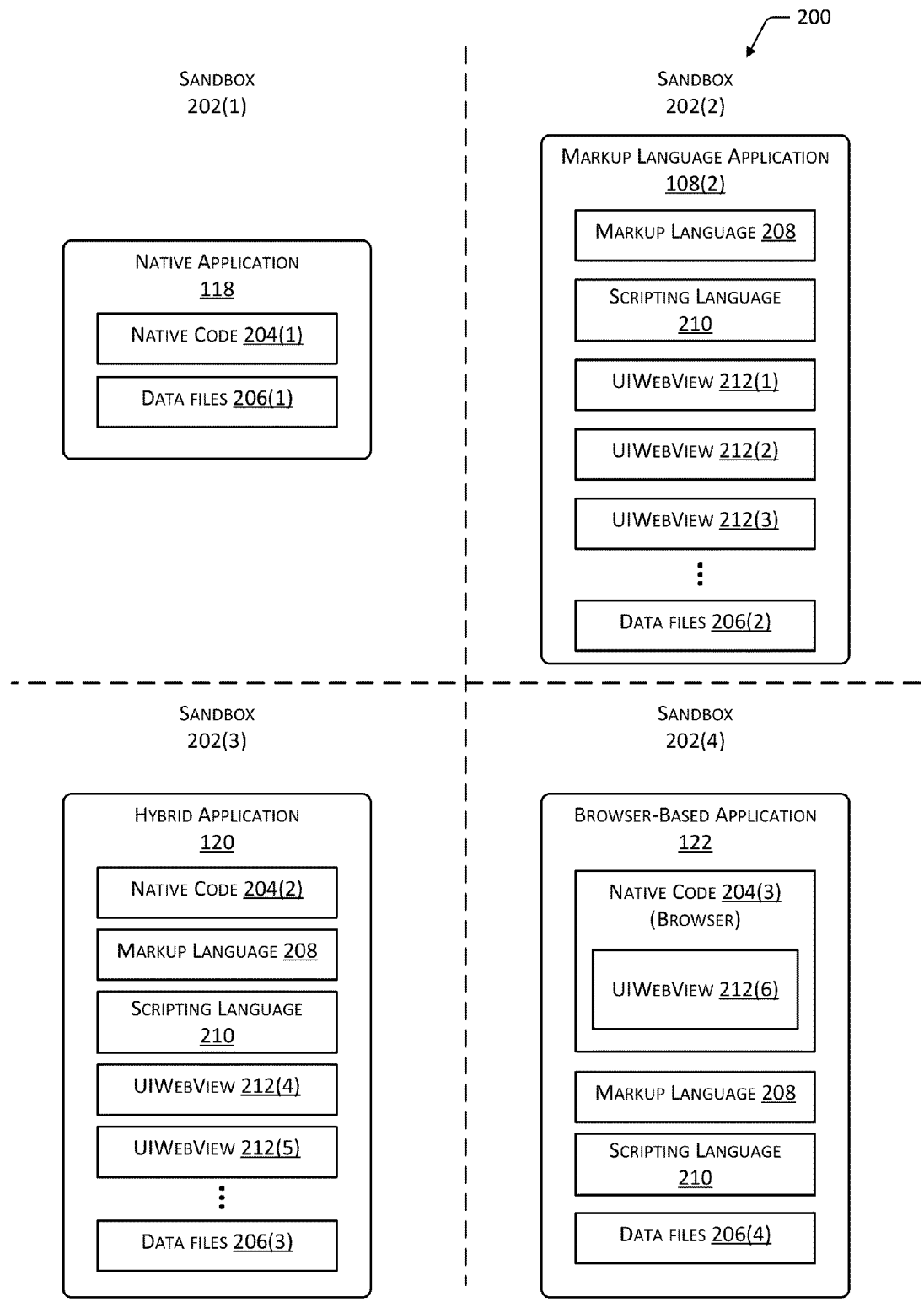
FIG. 2 illustrates different types of applications available for execution on the computing device, including those which use markup language.

FIG. 2 illustrates different types 200 of applications available for execution on the computing device 116. As described above, these types include the native application 118, the markup language application 108, the hybrid application 120, and the browser-based application 122.

Some operating systems executing on the computing devices 116 may provide for sandboxes 202 or sandboxing. The sandbox 202 comprises an environment with access controls applied to executing processes. These access controls may be provided to limit or control interactions between the executing applications and with other devices or applications. Sandboxing may be used to mitigate the effects of malicious or improperly-coded applications. In some implementations the sandboxes 202 may be implemented as separate virtual machines within which the application may execute. Some operating systems, such as the iOS® operating system by Apple Corp. provide for sandboxing applications.

In this illustration four sandboxes 202(1)-(4) are depicted, with a different application in each. However, it is understood that in some implementations, sandboxing may be omitted and the various applications may execute in a common environment.

The sandbox 202(1) contains the native application 118. As described above, the native application 118 is written and compiled for execution on the particular computing device 116 platform. The native application 118 comprises native code 204 and may also include one or more data files 206. The native code 204 comprises a binary executable for use on a particular platform. For example, the native application 118 may be written in a programming language such as Objective C and compiled into native code 204(1). The data files 206(1) may include application cache, proxy server caches, user preferences, user data, and so forth. For example, in one implementation the data files 206 may include a cache used by a web browser application.

The sandbox 202(2) contains the markup language application 108(2). The markup language application 108(2) includes one or more instructions expressed in a markup language 208. The markup language 208 may use one or more tags to specify particular rendering of content. For example, the markup language 208 may comprise instructions compliant with hypertext markup language ("HTML") version 5 (or higher). The markup language 208 may also include cascading style sheets ("CSS"). While the examples in this disclosure use HTML5 or later, the systems and methods described may also be applied to other markup languages.

The markup language application 108(2) may also include instructions expressed in a scripting language 210. The scripting language 210 is configured for processing by an interpreter during execution. For example, the scripting language 210 may comprise JavaScript and the interpreter may comprise the JavaScript Core in WebKit®. While the examples in this disclosure use JavaScript, the systems and methods described may also be applied to other scripting languages.

In some implementations the markup language application 108 may have multiple instances of the UIWebView 212 class references. These UIWebView 212 instances enable presentation of content expressed using a markup language 208 such as HTML5 with CSS and a scripting language 210 such as JavaScript. For example, as depicted here, the markup language application 108(2) may have UIWebView instances 212(1)-(3).

The markup language application 108 may also have one or more data files 206. As described above, the data files 206(2) may include property list ("PLIST") files, caches, user preferences, user data, icons, cookies, databases, temporary files, temporary directories, and so forth. In some implementations a portion or all of the data files 206 may be stored on a remote device, such as a backend server accessible via the Internet. Software developers may thus minimize or eliminate the data which is stored locally on the computing device 116. This may be done to reduce local storage requirements, improve security of the data, and so forth. For example, upon loss or compromise of the computing device 116, the backend server may terminate access, safeguarding the data. Use of the backend server may also minimize or eliminate the complexity associated with encrypting contents in the data files 206 to further safeguard data. The implementation of the markup language application 108 as a front end and the use of the backend server allows for easier purging of data associated with the application when the application is exited or terminated.

The development tool module 104 may be configured to access information about the data files 206 and present that information to the developer for testing, debugging, inspection, and so forth of the local store associated with the remote application under test 124.

For example, consider an example markup language application 108(2) executing in the sandbox 202(2) of the computing device 116 which is executing the iOS® operating system. In this example, the data files 206, such as 206(2), which are associated with remote applications under test 124 may be stored on the computing device 116 at a directory location /var/mobile/Applications/[device specific] where [device specific] indicates a value which may vary from one computing device 116 to another. The files may be analyzed, debugged, or tested, using various tools of the development tool module 104 as appropriate to the file types. For example, where the *.db files indicated above such as EAsyncstore.db use SQLite as developed by D. Richard Hipp and others, the sqlite3 utility be used to execute commands against the database.

As described above, the data files 206 may also include session cookies. A command 110 may be used to retrieve these session cookies.

The development tool module 104 may also include the plutil as provided with the Mac OS from Apple Corp. to interact with session PLIST files, user data PLIST files, and so forth.

By using the development tool module 104, the developer may assess the data files 206 which are locally stored on the computing device 116 by the remote application under test 124. For example, the above information about the data files 206 may be presented within the Safari® Inspector.

In some implementations the data files 206 may be cleared prior to, during, or after testing. For example, a command 110 may be issued by a developer module 140. The command 110 may be configured to clear a browser cache prior to testing page load times. In some implementations other caches such as a cache used by a proxy server may be cleared.

To clear the cache, or provide other actions on data in the file system of the computing device 116, the file system of the computing device 116 may be mounted by the development device 102. Once mounted, files, such as cache files, may be deleted.

In the implementation described below, a Filesystem in Userspace (FUSE) kernel module may be loaded on a computing device 102 which is executing the MacOS from Apple Corp. In one implementation MacFUSE may be used. MacFUSE may be obtained from http://code.google.com/p/macfuse/ or other locations. The following example illustrates the use of MacFUSE; however other FUSE implementations may also be used, such as OSXFuse.

A fuse kernel module is loaded into the kernel, such as by the command:

insmod fuse.ko

The userid of mountAppDirectory may be added to the fuse group using:

adduser <uid> fuse

The MacFUSE application may be installed, and the command "run mountAppDirectory" may be executed. The MACFuse application attempts to connect with the Apple File Connection (AFC) or AFC2 using lockdownd. The iOS® operating system module of the computing device 116 provides the AFC/AFC2 service.

The document sharing service com.apple.mobile.house_arrest which is available on iOS® may then be started. The house_arrest makes an app container of the markup language application 108 which is undergoing testing available for sharing. Using the AFC/AFC2 connection, the directory is accessible using MACFuse. Once accessible file operations such as cache files associated with the browser application module 414 may be deleted.

The sandbox 202(3) depicts the hybrid application 120. As described above, the hybrid application 120 includes native code 204 as well as markup language 208, scripting language 210, or both. For example, portions of native code 204 may be used to interact with platform-specific hardware such as a graphics processing unit (GPU) or satellite navigation receiver, while portions of markup language provide business logic and user interface elements, such as controlling display of mapping information. Similar to the markup language application 108, multiple instances of the UIWebView 212(4) and 212(5) class references may be present. The hybrid application 120 may also have one or more associated data files 206(3).

The sandbox 202(4) depicts the browser-based applications 122. Browser-based applications 122 are processed within a web browser application and are limited in their execution by this constraint. The browser-based application 122 may include a web page or collection of web pages. In one implementation the web browser application may be the Safari® browser (also known as "Mobile Safari") by Apple Corp. and executing in the iOS® operating system, while in another implementation the web browser application may be the Chrome™ browser by Google, Inc. and executing in the iOS® operating system, the Android operating system, and so forth. The web browser application may access one or more of the markup language 208 or scripting language 210 for rendering and execution. The browser-based application 122 may have only a single UIWebView 212 instance.

The web browser application's native code 204(3), the rendered markup language 208, the executed scripting language 210, the corresponding single UIWebView 212(6) instance, and the data files 206(4) share the same sandbox 202(4). As a result, there is a potential for unwanted or undesired interactions. For example, the scripting language 210 may improperly invoke a function in the native code 204(3) and generate an error or malicious condition.

Among the types of applications, the markup language application 108 provides a useful blend of benefits. Cross-platform development and maintenance is less than that of native applications 118. Hybrid applications 120 leverage platform-specific native code 204 with the cross-platform capabilities of the markup language 208 and the scripting language 210. The markup language application 108 readily supports multiple UIWebView instances 212 allowing for rich application experiences compared to browser-based applications 122. Compared to the browser-based applications 122, the markup language application 108 and the hybrid application 120 may experience improved security by operating in a separate sandbox 202, omitting the web browser application, and so forth.

Figure 3:
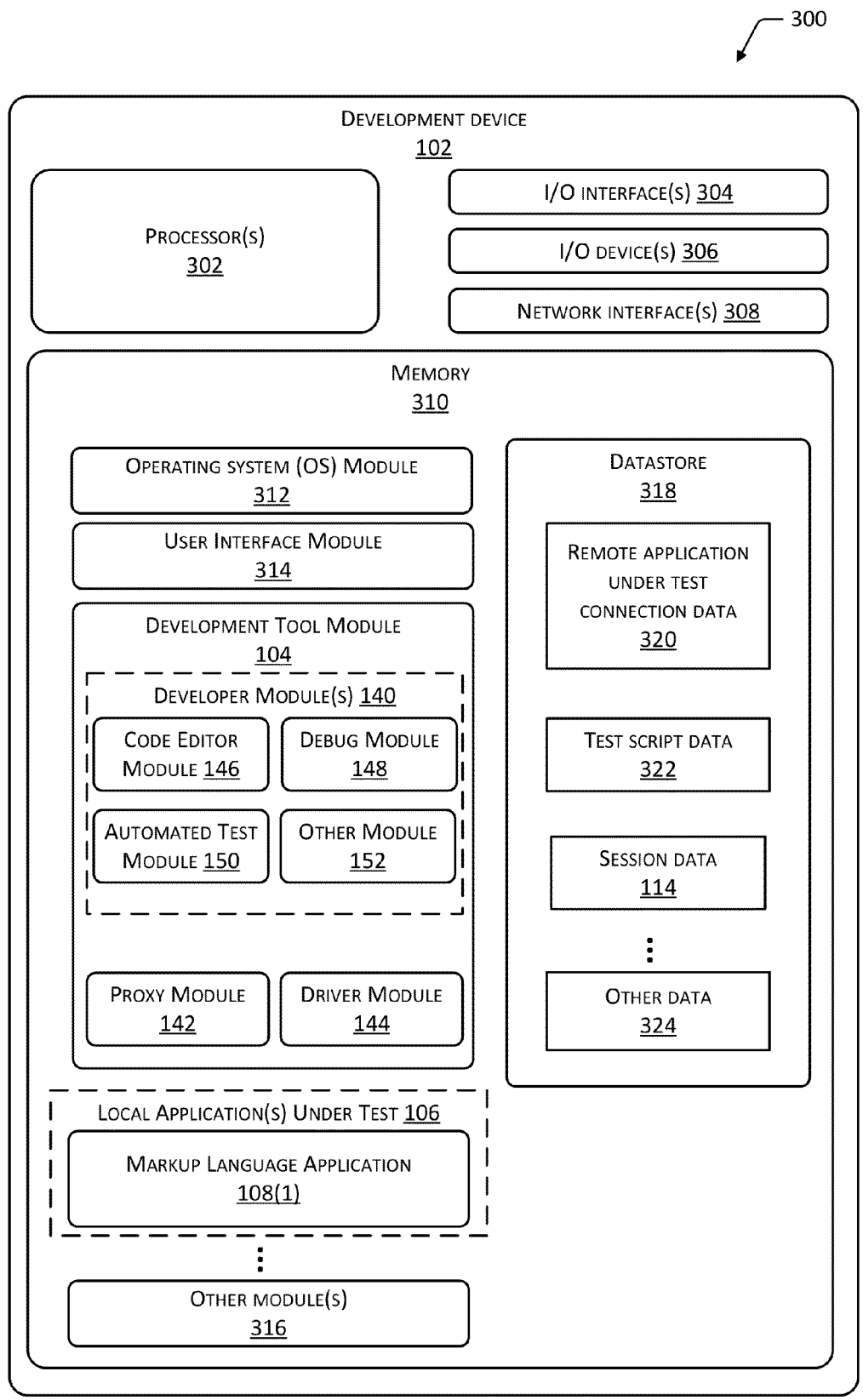
FIG. 3 depicts a block diagram of the development device configured to perform operations for testing markup language applications.

FIG. 3 depicts a block diagram 300 of the development device 102 configured to perform operations for testing markup language applications 108. The development device 102 may include one or more hardware processors 302 (processors) configured to execute one or more stored instructions.

The development device 102 may include one or more input/output (I/O) interface(s) 304 to allow the development device 102 to communicate with other devices. For example, the I/O interface(s) 304 may be configured to provide a universal serial bus (USB) connection compliant with the standards promulgated by the USB Implementers Forum, Inc. of Beaverton, Oreg. to couple to the computing device 116.

The I/O interface(s) 304 may couple to one or more I/O devices 306. The I/O device(s) 306 may include user input devices such as one or more of a keyboard, a mouse, a pen, a game controller, a voice input device, a touch input device, a gestural input device, and so forth. The I/O device(s) 306 may include output devices such as one or more of a display, a printer, audio speakers, haptic output devices, and so forth. In some embodiments, the I/O device(s) 306 may be physically incorporated with the development device 102 or be externally placed.

The development device 102 may also include one or more network interfaces 308 to enable communications between the development device 102 and other networked devices. Such network interface(s) 308 may include one or more network interface controllers (NICs) or other types of transceiver devices configured to send and receive communications over the network(s). For example, the network interface(s) 308 may be configured to provide a wired network connection, wireless Wi-Fi connection compliant with one or more IEEE 802.11 standards such as 802.11g or 802.11n, and so forth. The development device 102 may also include one or more busses or other internal communications hardware or software that allow for the transfer of data between the various modules and components of the development device 102.

The development device 102 includes one or more memories 310. The memory 310 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 310 provides storage of computer readable instructions, data structures, program modules, and other data for the operation of the development device 102.

The memory 310 may include at least one operating system (OS) module 312. The OS module 312 is configured to manage hardware resources such as the I/O interface(s) 304 and network interface(s) 308, and to provide various services to applications or modules executing on the processor(s) 302. In some implementations, the OS module 312 may comprise one or more operating systems configured for execution on the development device 102. For example, the OS module 312 may implement one or more of Mac OS® from Apple Corp. of Cupertino, Calif.; Windows® from Microsoft Corp. of Redmond, Wash.; Linux and its derivatives from various sources; FreeBSD; UNIX; or other operating systems.

The memory 310 may include a user interface module 314, the development tool module 104, a local application under test 106, one or more of the developer modules 140, or other module(s) 316. For example, the memory 310 may store at least a portion of the development tool module 104 and developer modules 140 such as the Safari® Inspector from Apple Corp., the Chrome™ DevTools, and so forth.

The memory 310 also includes a datastore 318 to store information for operations of the development device 102. The datastore 318 may comprise a database, array, structured list, tree, executable code, markup language, or other data structure. In some implementations, the datastore 318 may store remote application under test connection data 320. For example, the connection data such as USB port, device identifier, address, and so forth may be stored. Test script data 322 may be stored which defines particular tests or functions be executed by the development tool module 104 against an application under test. The test script data 322 may comprise a series of instructions or commands configured to initiate or otherwise perform the tests or functions to exercise the application under test. In one example, the test script data 322 may comprise one or more commands configured to clear a browser cache, initiate a debugging session, enable a web inspector, specify a network address, open a web page at the network address, and so forth.

In some implementations the test script data 322 may be provided as described in U.S. patent application Ser. No. 13/868,560, filed on Apr. 23, 2013, titled "Test Script Generation" to Manish Lachwani, et al. which has been incorporated by reference into this disclosure.

The session data 114 may be stored in the datastore 318. As described elsewhere in this disclosure, in some implementations the session data 114 may be stored in a JSON format.

Example JSON session data:

```
[{
    "devtoolsFrontendUrl":
"src/devtools/devtools.html?host=localhost:8999&page=1",
    "faviconUrl": " ",
    "thumbnailUrl":
"/thumb/http://news.example.com/?ar=1386497377#pcid=FRONTPAGE",
    "title": "Google News",
    "url":
"http://news.example.com/?ar=1386497377#pcid=FRONTPAGE",
    "webSocketDebuggerUrl":
"ws://localhost:8999/devtools/page/1"
},{
    "devtoolsFrontendUrl":
"src/devtools/devtools.html?host=localhost:8999&page=2",
    "faviconUrl": " ",
    "thumbnailUrl": "/thumb/http://www.example2.com/south-
africa-v-india-2013-14/engine/match/648653.html",
    "title":"2nd ODI:South Africa v India at San Jose, Dec
12, 2013 | Cricket Scorecard | ABCD Cricinfo",
    "url": "http://www.example2.com/south-africa-v-india-
2013-14/engine/match/648653.html",
    "webSocketDebuggerUrl":
"ws://localhost:8999/devtools/page/2"
}]
```

Other data 320 may also be stored, such as software developer preferences, configuration settings for the development tool module 104, and so forth.

Figure 4:
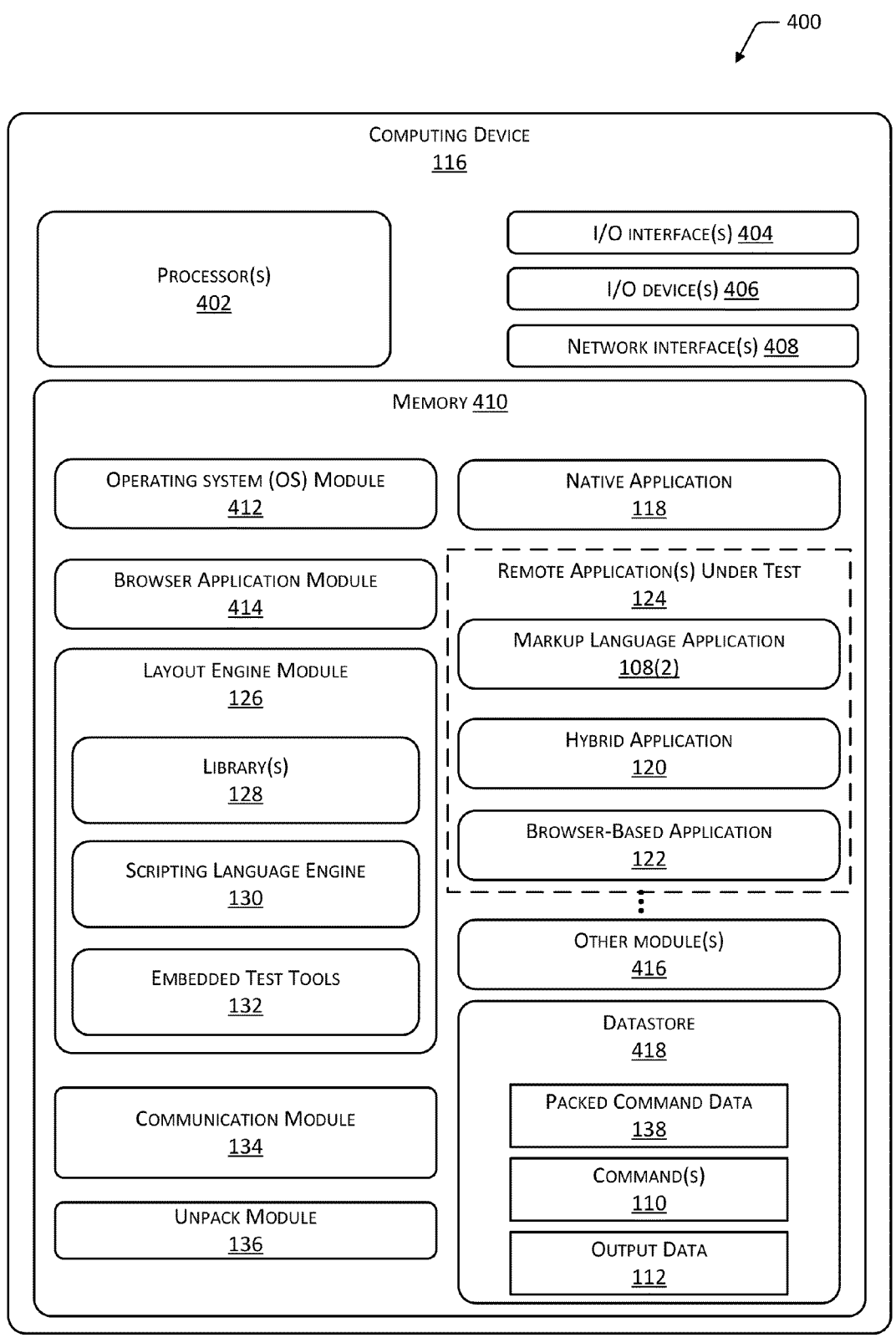
FIG. 4 depicts a block diagram of the computing device configured to perform operations for testing markup language applications.

FIG. 4 depicts a block diagram 400 of the computing device 116 configured to perform operations for testing markup language applications 108. The computing device 116 may include one or more processors 402 configured to execute one or more stored instructions. The processors 402 may comprise one or more cores.

The computing device 116 may include one or more input/output (I/O) interface(s) 404 to allow the computing device 116 to communicate with other devices. For example, the I/O interface(s) 404 may be configured to provide a universal serial bus (USB) connection to couple to the development device 102.

The I/O interface(s) 404 may couple to one or more I/O devices 406. The I/O device(s) 406 may include user input devices such as one or more of a keyboard, a mouse, a pen, a game controller, a voice input device, a touch input device, a gestural input device, or other devices. The I/O device(s) 406 may include output devices such as one or more of a display, a printer, audio speakers, haptic output devices, and so forth. In some embodiments, the I/O device(s) 406 may be physically incorporated with the computing device 116 or be externally placed.

The computing device 116 may also include one or more network interfaces 408 to enable communications between the computing device 116 and other networked devices such as those depicted in FIG. 1. Such network interface(s) 408 may include one or more network interface controllers (NICs) or other types of transceiver devices configured to send and receive communications over the network(s). For example, the network interface(s) 408 may be configured to provide a Wi-Fi connection compliant with one or more IEEE 802.11 standards such as 802.11g or 802.11n. The computing device 116 may also include one or more busses or other internal communications hardware or software that allow for the transfer of data between the various modules and components of the computing device 116.

The computing device 116 includes one or more memories 410. The memory 410 comprises one or more CRSM as described above. The memory 410 provides storage of computer readable instructions, data structures, program modules, and other data for the operation of the computing device 116.

The memory 410 may include at least one operating system (OS) module 412. The OS module 412 is configured to manage hardware resources such as the I/O interface(s) 404 and network interface(s) 408, and to provide various services to applications or modules executing on the processor(s) 402. In some implementations, the OS module 412 may comprise one or more mobile operating systems configured for execution on mobile computing devices. For example, the OS module 412 may implement one or more of iOS® from Apple Corp. of Cupertino, Calif.; Windows Mobile® from Microsoft Corp. of Redmond, Wash.; Android® from Google, Inc. of Mountain View, Calif. and its derivatives from various sources; Palm OS® from Palm Computing, Inc. of Sunnyvale, Calif. and its derivatives from various sources; BlackBerry OS® from Research In Motion Ltd. of Waterloo, Ontario, Canada; or other operating systems such as VxWorks from Wind River Systems of Alameda, Calif. In cases where the OS module 412 implements a version of iOS®, any version of iOS® may be supported including iOS® 1.x, 2.x, 3.x, 4.x, 4.x, 6.x, 7.x, or higher versions, including any version of iOS® for the iPhone®, iPad®, iPod Touch®, or any other compatible, derivative, or related device. In cases where the OS module 412 implements a version of Android®, any version of Android® may be supported including but not limited to versions 2.3.x "Gingerbread," 4.0.x "Ice Cream Sandwich," 4.1.x "Jelly Bean," and so forth. As described above with regard to FIG. 2, in some implementations the OS module 412 may be configured to sandbox applications 202.

The memory 410 may include a browser application module 414. This browser application module 414 may be implemented as a native application 118, compiled for execution on the particular platform of the computing device 116. For example, where the platform comprises an Apple Corp. device running the iOS® operating system, the browser application module 414 may comprise the Safari® mobile browser.

The memory 410 may also include the layout engine module 126 as described above. In some implementations the layout engine module 126 may comprise the WebKit® framework and associated libraries 128, scripting language engine 130, and embedded test tools 132. The browser application module 414 or other applications on the computing device 116 may utilize at least a portion of the layout engine module 126 during operation. For example, the Safari® mobile browser may use the JavaScript core in WebKit® for execution of the scripting language 210 which comprises JavaScript.

The layout engine module 126 may be initialized prior to testing. The initialization may be configured to activate the embedded test tools 132. For example, where the layout engine module 126 comprises WebKit®, the WebKit® listener may be placed into an inspection mode configured to receive commands from the Safari® Inspector. In another example, the web inspector process com.apple.webinspectord may be loaded. In this example, the lockdownd process present in iOS® may be used to start com.apple.webinspectord.

In some implementations where information about how to initialize or otherwise activate the embedded test tools 132 is not readily available, the layout engine module 126 or other applications may be analyzed as described in U.S. patent application Ser. No. 13/631,919, filed on Sep. 29, 2012, titled "Application Validation Through Object Level Hierarchy Analysis," and in U.S. patent application Ser. No. 13/655,667, filed on Oct. 19, 2012, titled "Application Auditing Through Object Level Code Inspection," both of which are incorporated by reference into this disclosure.

The testing described herein may further be facilitated using the systems and methods described in U.S. patent application Ser. No. 13/619,867, filed on Sep. 14, 2012, titled "Remote Control of a Mobile Device" which is incorporated by reference into this disclosure.

The communication module 134 and the unpack module 136 are also stored in the memory 410. As described above, the communication module 134 is configured to send and receive information to a device external to the computing device 116, such as the development device 102. In one implementation, the communication module 134 may comprise a lightweight HTTP server. In another implementation, the communication module 134 may comprise the Apple Corp. usbmuxd process which provides data transport over the USB connection.

As also described above, the unpack module 136 is configured to process the packed commands 138 and provide unpacked commands 110(2) to the layout engine module 126. The unpacked commands 110(2) are compatible with the embedded test tools 132 and other aspects of the layout engine module 126 and an associated framework. In some implementations, the commands 110 may be provided by the developer modules 140 directly, or may be provided by the driver module 144.

The memory 410 may include native applications 118, markup language applications 108, hybrid applications 120, browser-based applications 122, and so forth. As described above, the remote applications under test 124 may include one or more of the markup language application 108, the portion of the hybrid application 120 which is non-native code, or the portion of the browser-based application 122 which uses a markup language.

Other modules 416 may also be stored in the memory 410, such as digital rights management modules, speech recognition modules, and so forth.

The memory 410 also includes a datastore 418 to store information for operations of the computing device 116. The datastore 418 may comprise a database, array, structured list, tree, or other data structure. The datastore 418 may store the packed command data 138, unpacked command data 110(2), the output data 112, or both. Other data may also be stored, such as user preferences, configuration settings, and so forth.

The techniques described in this disclosure may use one or more services, applications, or processes which are provided by the OS module 412 in a secured configuration, such as a non-jailbroken device as shipped from a manufacturer. For example, the development tool module 104 may be used to gather session data 114 associated with the remote application under test 124, such as the markup language application 108(2). This may occur without the use of root or super user privileges.

However, in other cases, one or more modifications may be made to the computing device 116. For example, the OS module 412 may be "rooted" or "jailbroken" prior to installation of the communication module 134, the unpack module 136, and so forth. "Rooting" or "jailbreaking" may include bypassing one or more security constraints imposed by the OS module 412, and may provide unrestricted (or minimally restricted) access to the file system, portions of the OS module 412, processes executing on the computing device 116, and so forth. For example, root or super user privileges may be available on a jailbroken device, as compared to a non-jailbroken in which root or super user privileges are unavailable or strictly curtailed.

Figure 5:
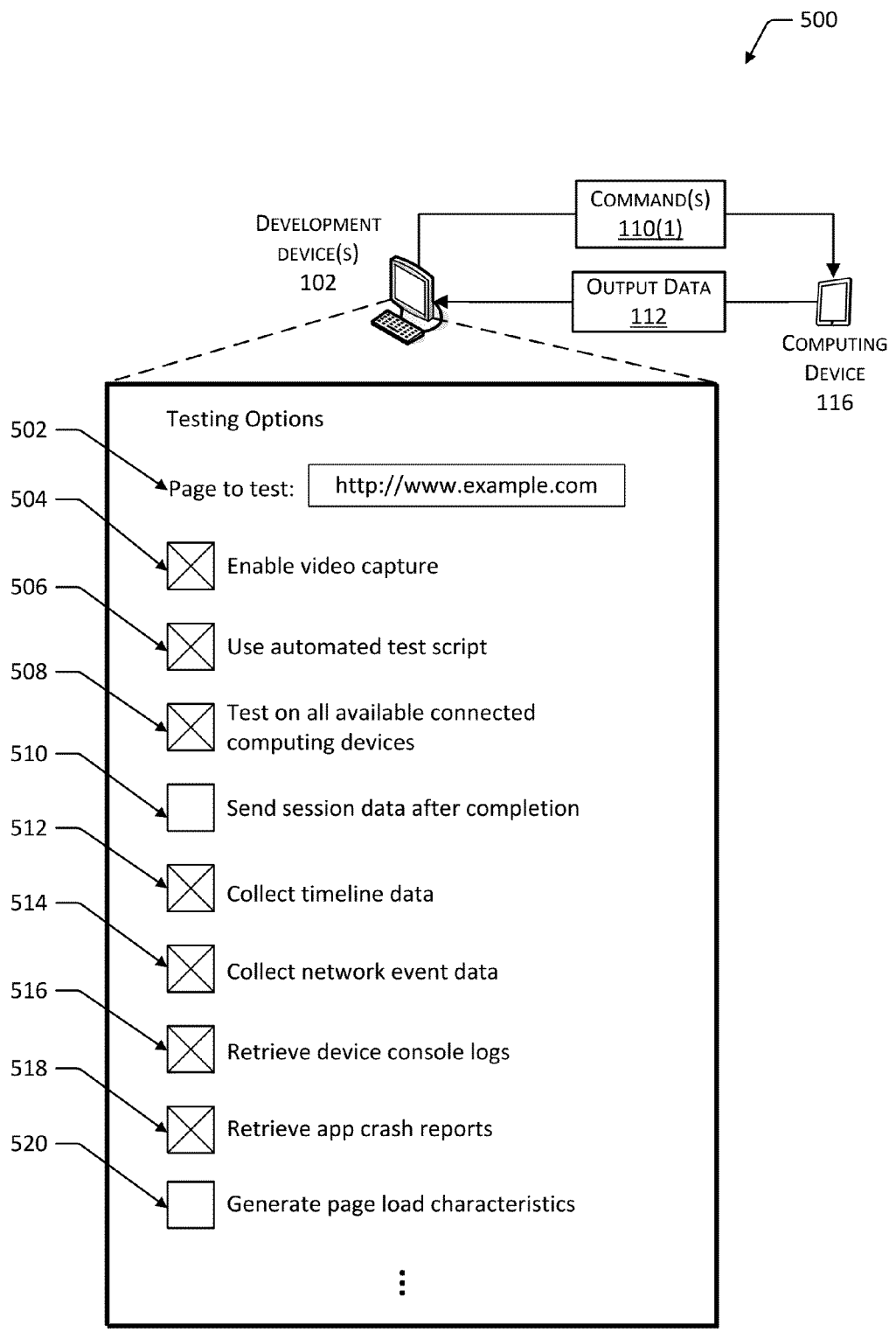
FIG. 5 depicts a user interface of testing options which may be selected by a developer for testing.

FIG. 5 depicts a user interface 500 of testing options which may be selected for testing. Several options may be selected which may affect the execution of the remote application under test 124. These options may include one or more of specifying a network address of a web page to test 502, enabling video capture 504, using an automated test script 506, testing on all available connected computing devices 508, sending session data after completion 510, collecting timeline data 512, collecting network event data 514, retrieving device console logs 516, retrieving app crash reports 518, generating page load characteristics 520, and so forth.

The option to specify network address of a web page to test 502 may be used to test performance of a particular web page. For example, the user may specify a URL with a web page to load and render in the browser application 414.

The option to enable video capture 504 may be used to capture video output as presented on the display of the computing device 116 during a run of the test. For example, the developer may select this option such that when a failure in execution of the markup language application 108 is determined, the failure may be observed.

The option to use an automated test script 506 may allow for automated testing. Automated testing allows one or more tests to be run one or more times without human intervention during the testing. The automated testing may use the test script data 322 described above. The automated tests may be manually created or automatically generated.

The option to test on all available connected computing devices 508 may allow for the use of a plurality of computing devices 116 which are connected to the development device 102. For example, the testing may be performed on twenty computing devices 116 attached to the development device 102.

The option to send session data after completion 510 may be used to send the session data 114 to another developer module 140, development device 102, external server, and so forth. For example, the session data 114 may be sent to a build server following completion of testing.

The option to collect timeline data 512 may be used to collect information about what actions by the markup language application 108 occur at what times, in what sequence, and for how long. For example, the Chrome™ DevTools provide a JavaScript Console which includes timeline functionality.

The option to collect network event data 514 may be used to acquire data about information which is sent to and from one or more of the network interfaces 408 by the markup language application 108. For example, the Chrome™ DevTools provide network event capture and analysis capabilities.

The option to retrieve device console logs 516 may be used to access console logs generated on the computing device 116. For example, the console logs may provide information about kernel failures, application crashes, and so forth.

The option to retrieve app crash reports 518 may be used to access crash reports from the computing device 116. The crash reports may be generated by the OS module 412, the layout engine module 126, and so forth.

The option to generate page load characteristics 520 may be used to acquire information, or calculate from previously acquired session data 114, information about load times of the markup language application 108. For example, this may include determining time to load a document object model (DOM), time to load the entire page, and so forth. In some implementation, selection of this option may result in commands 110 being sent to the computing device 116 to clear a browser cache or other previously stored files associated with the markup language application 108 being tested.

In some implementations, selection of one option may result in selection or deselection of another option. For example, selection of the option to generate page load characteristics 520 may result in deselection of the option to collect timeline data 512 as this may result in significant overhead on the computing device 116, distorting the resulting page load times.

Other options and tests may be available as well. These may include, but are not limited to, retrieving DOM debugger and script parsing output, retrieving information about processor bound threads, heap size utilization, rendering time, paint time, measuring hardware statistics such as memory, processor, disk, network, and so forth.

By allowing the developer to collect and access this information, particularly in an automated fashion on real browser applications executing on actual computing devices 116, the development process is improved. The impact of changes in the code of the markup language application 108 may be determined and debugged, which may result in improved markup language applications 108.

Other options may be provided as well. For example, the developer may specify use of particular audio libraries for use in audio processing.

Figure 6:
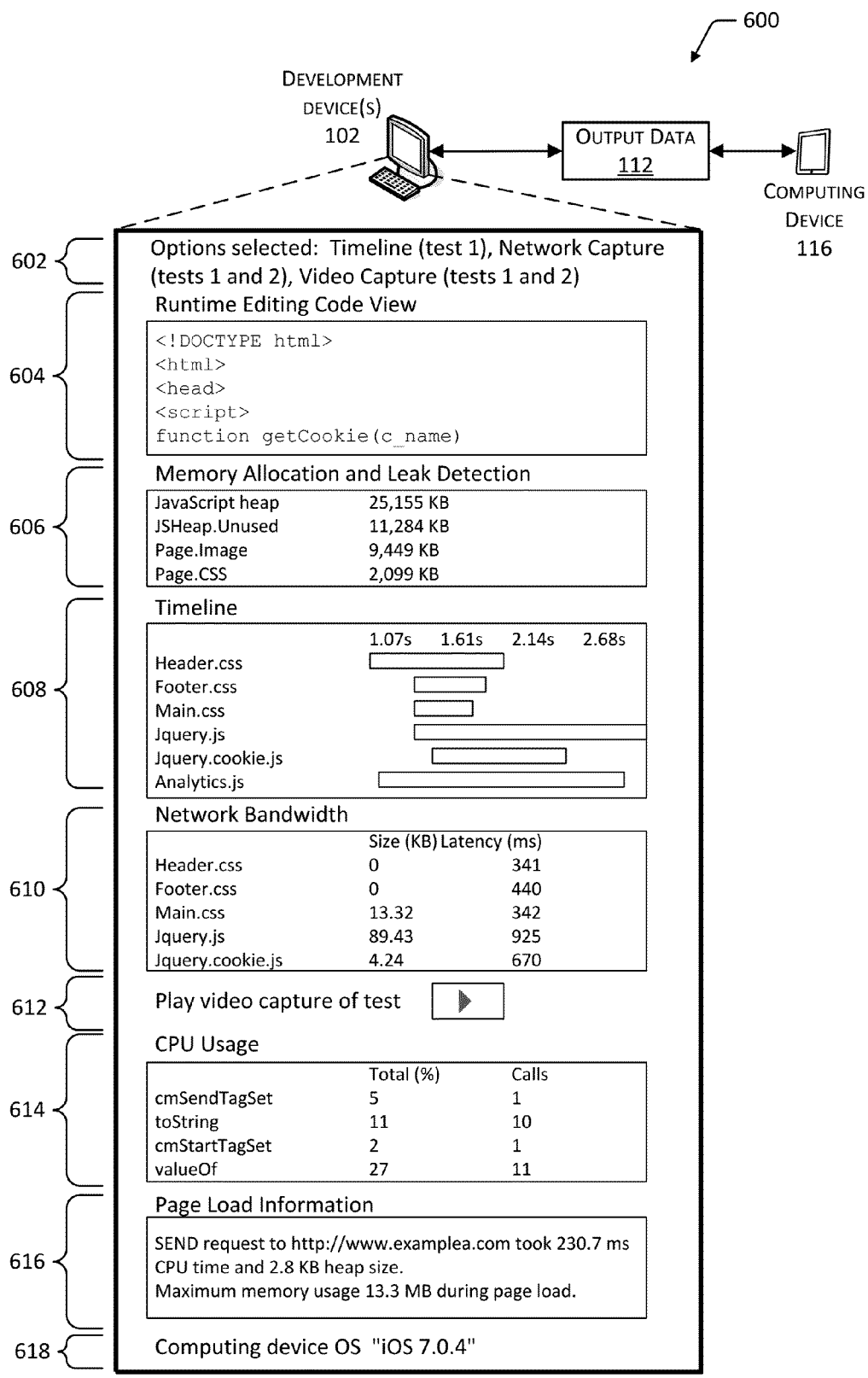
FIG. 6 depicts a user interface of testing results from the markup language application executing on the remote computing device.

FIG. 6 depicts a user interface 600 of output data 112. The output data 112 may be received using the communication module 134 from the remote application under test 124 executing on the computing device 116. In other implementations, the output data 112 may be stored locally to the computing device 116 and retrieved. In some implementations the development tool module 104 may provide this user interface 600. The session data 114 may also be used in some implementations to provide the information presented in this user interface 600.

The output data 112 is depicted in a graphical user interface, however in other implementations the information may be presented as a character user interface, or may be stored for processing by another application. For example, the output data 112 may be stored for processing by an analytical application such as Splunk by Splunk Inc. of San Francisco, Calif., Nagios as promulgated by Nagios Enterprises LLC of Saint Paul, Minn.

The user interface 600 may include one or more indications 602 of options which have been selected. For example, these may include the options discussed above with respect to FIG. 5.

A runtime editing code view 604 is presented. In this view, the software developer may see a portion of the code such as the markup language 208, the scripting language 210, or both, at a particular point in execution. For example, the runtime editing code view 604 may present a portion of the code where an error has occurred. The runtime editing code view 604 may also allow the software developer to make changes to the code for subsequent testing.

Memory allocation and leak detection data 606 may be depicted. This information may include information such as memory allocated to particular processes. For example, the software developer may use this information to determine that the markup language application 108 has a particular process which has been allocated memory for use but is not released after use or is inaccessible.

Timeline data 608 may be presented. The timeline data 608 may present information about which elements have been accessed, the duration of that access, and so forth. Network bandwidth data 610 may also be presented. The network bandwidth data 610 provides information about a quantity of data transferred with respect to a particular element and the duration of that transfer.

A control to play video capture of a particular test 612 may be provided. For example, the user interface 600 may provide a control to playback the video capture of the test session.

CPU usage data 614 or other information about hardware resource usage on the computing device 116 may also be presented. In this illustration, various threads of the remote application under test 124 and their associated usage of processor 402 resources may be presented to the software developer.

Page load information 616 may be provided in the user interface 600. For example, in this illustration details about a particular SEND request and a maximum amount of memory used during page load is presented.

In some implementations, the user interface 600 may also provide information indicating the operating system executing on the computing device 116. For example, the tests were run on a computing device 116 executing iOS 7.0.4.

The test results and functions depicted are provided for illustration, and not by way of limitation. In some implementations additional tests may be added, some tests may be omitted, and so forth.

Illustrative Processes

Figure 7:
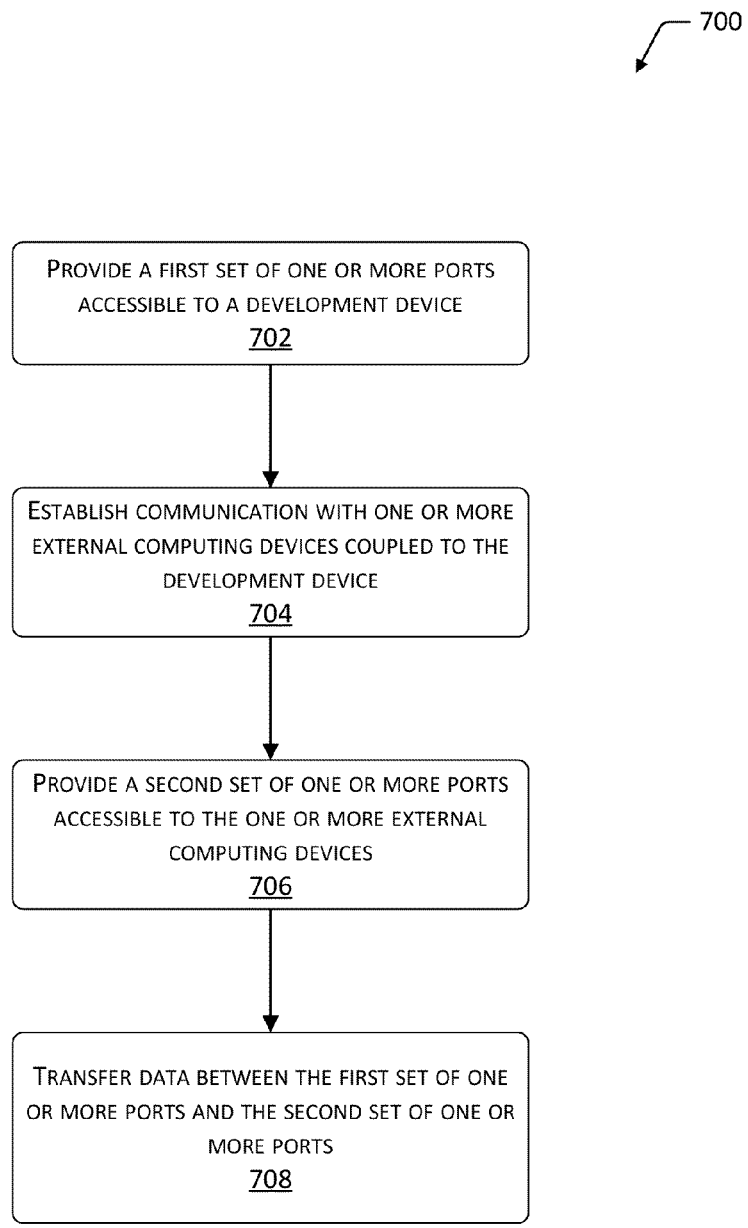
FIG. 7 depicts a flow diagram of a process of a proxy module operating on a development device during debugging.

FIG. 7 depicts a flow diagram 700 of a process of the proxy module 142 operating on the development device 102 during debugging of the remote application under test 124. The remote application under test 124 may comprise a markup language application 108. As described above the markup language may comprise HTML version 5 or higher.

Block 702 provides a first set of one or more ports. The first set of one or more ports are accessible to the developer modules 140, the driver module 144, or both. The proxy module 142 may be configured to receive the one or more commands 110 at the first set of one or more ports.

Block 704 establishes communication with one or more external computing devices 116 coupled to the development device 102. In one implementation, this may include initiating a connection via a USB using the Mobile Device framework as promulgated by Apple Corp. with the external computing device 116 executing a version of the iOS® operating system version 7.0 or higher as promulgated by Apple Corp.

As described, the external computing device 116 may be configured to execute the layout engine module 126 within an operating system having a secured configuration. For example, where the computing device 116 is executing the iOS® operating system, the OS module 412 may not be "jailbroken".

Block 706 provides a second set of one or more ports. The second set of one or more ports are accessible to one or more of the modules which may execute on the computing device 116. For example, the second set of one or more ports may be accessible to the layout engine module 126 which is executable on the external computing device 116. As described in this disclosure, the layout engine module 126 may comprise one or more portions of WebKit®, the com.apple.webinspectord daemon, or a combination thereof. Communication may be established with the external computing device 116 using the second set of one or more ports.

The first set of ports, the second set of ports, or both, may be compliant with the WebSocket protocol as promulgated by the Internet Engineering Task Force Request For Comments (RFC) 6455. In one implementation, such as where the driver module 144 is implemented using the Ruby programming language, the faye WebSocket implementation may be used. Faye is promulgated by James Coglan at faye.jcoglan.com.

Block 708 transfers data such as the commands 110, the output data 112, and so forth between the first set of one or more ports and the second set of one or more ports. For example, the command 110 received by the first set of ports from the debugger module 148 may be passed via a WebSocket connection of the first set of one or more ports, and transferred to the second set of one or more ports for delivery to the layout engine module 126. In another example, data (such as the output data 112) may be received from the external computing device 116 using the second set of one or more ports. For example, output data 112 generated at least in part by the layout engine module 126 may be transferred by the proxy module 142 and received by one or more of the developer modules 140.

In one implementation, the one or more commands 110 may be generated by one or more of the developer modules 140. The one or more commands 110 may be configured to control at least a portion of the execution of the remote application under test 124 which is configured to execute on the computing device 116. For example, the automated test module 150 may generate commands 110 which are configured to set one or more parameters for testing, such as a network address indicative of a location from which to retrieve a list of portion of the remote application under test 124. Continuing the example, the network address may comprise a URL which is associated with the remote application under test 124 comprising one or more webpages. The one or more commands 110 may be provided to the external computing device 116 using the second set of one or more ports. For example, the one or more commands 110 may be sent to the com.apple.webinspectord service executing on the external computing device 116 within the iOS® operating system.

In some implementation the developer module 140 may use the proxy module 142, the driver module 144, or both for automated testing. In this implementation, the developer module 140 may access an automated test script, such as the automated test script data 322. Once accessed, the developer module 140 may generate or replay the one or more commands 110 based on the automated test script. For example, the automated test module 150 may access the test script data 322 and begin executing the script.

As described elsewhere in this disclosure, the proxy module 142 may receive commands 110 from the driver module 144. For example, as described elsewhere in this disclosure, the driver module 144 may convert the commands 110 from a first form to a second form. The proxy module 142 may then pass those commands 110 which are now in the second form to the computing device 116.

In one implementation, the commands 110 may be compliant with at least a portion of remote debugging protocol as promulgated by Google Inc. of Mountain View, Calif. The external computing device 116 may execute the iOS® operating system version 7.0 or higher as promulgated by Apple Corp. of Cupertino, Calif. In this implementation, the proxy module 142 serves to connect the developer modules 140 which use the remote debugging protocol and one or more modules executing in the iOS® operating system, such as the com.apple.webinspectord, WebKit®, and so forth.

Figure 8:
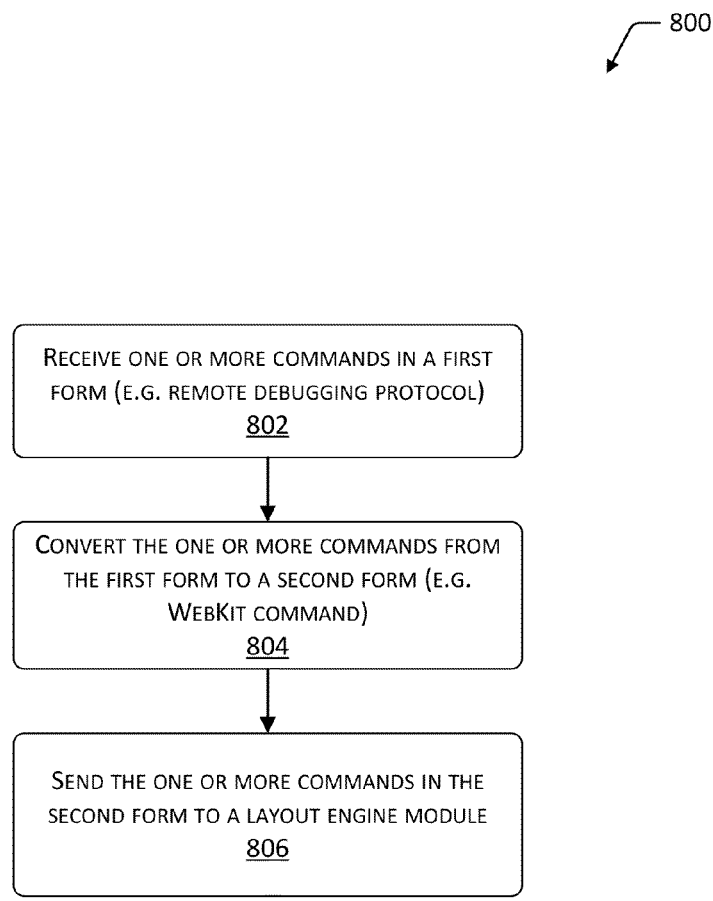
FIG. 8 depicts a flow diagram of a driver module converting commands from a first form to a second form.

As described elsewhere in this disclosure, such as with regard to FIG. 8, the commands 110 may be converted from a first form to a second form. In one implementation, prior to providing the commands 110, the driver module 144 may convert the one or more commands 110 provided to the external computing device to one or more expressions configured to control operation of a WebKit® layout engine module 126.

Other commands 110 may also be transferred by the proxy module 142. In one implementation at least a portion of the one or more commands 110 may be configured to clear a browser cache (or other cache) associated with the layout engine module 126. In this implementation, as described elsewhere in this application, MacFUSE may be used to access the app container of the remote application under test 124 to delete files such as those stored within the cache.

FIG. 8 depicts a flow diagram 800 of the driver module 144 converting commands from a first form to a second form. In some implementations, "form" may refer to a format, syntax, grammar, or other mechanism to structure a command 110. For example, the first form may comprise a command 110 which is compliant with the remote debugging protocol, while the second form of the same command 110 may be expressed as an application call to a WebKit® interface.

Block 802 receives one or more commands 110 expressed in a first form. While in the first form, the command 110 may be inoperable to control the layout engine module 126 of one or more of the computing device 116. For example, the first form of the command 110 may be unrecognized by the layout engine module 126.

Block 804 converts the command 110 from the first form to a second form, wherein the layout engine 126 is controllable by the second form. For example, the conversion may change a remote debugging protocol command 110 to a WebKit® call.

Block 806 provides the second form of the command 110 to the layout engine module 126 on the computing device 116. For example, the driver module 144 may use the proxy module 142 to send the second form of the command 110 to the layout engine 126.

In one implementation the second form of the command 110 may be received at a first set of one or more WebSocket ports. Communication may be established with the computing device 116 at a second set of one or more WebSocket ports. The second form of the command 110 may be sent to the layout engine module 126 using the second set of one or more WebSocket ports. The driver module 144 provides the capability for the developer modules 140, which may not otherwise be compatible, to operate the layout engine module 126 or other services or modules provided by the computing device 116.

Figure 9:
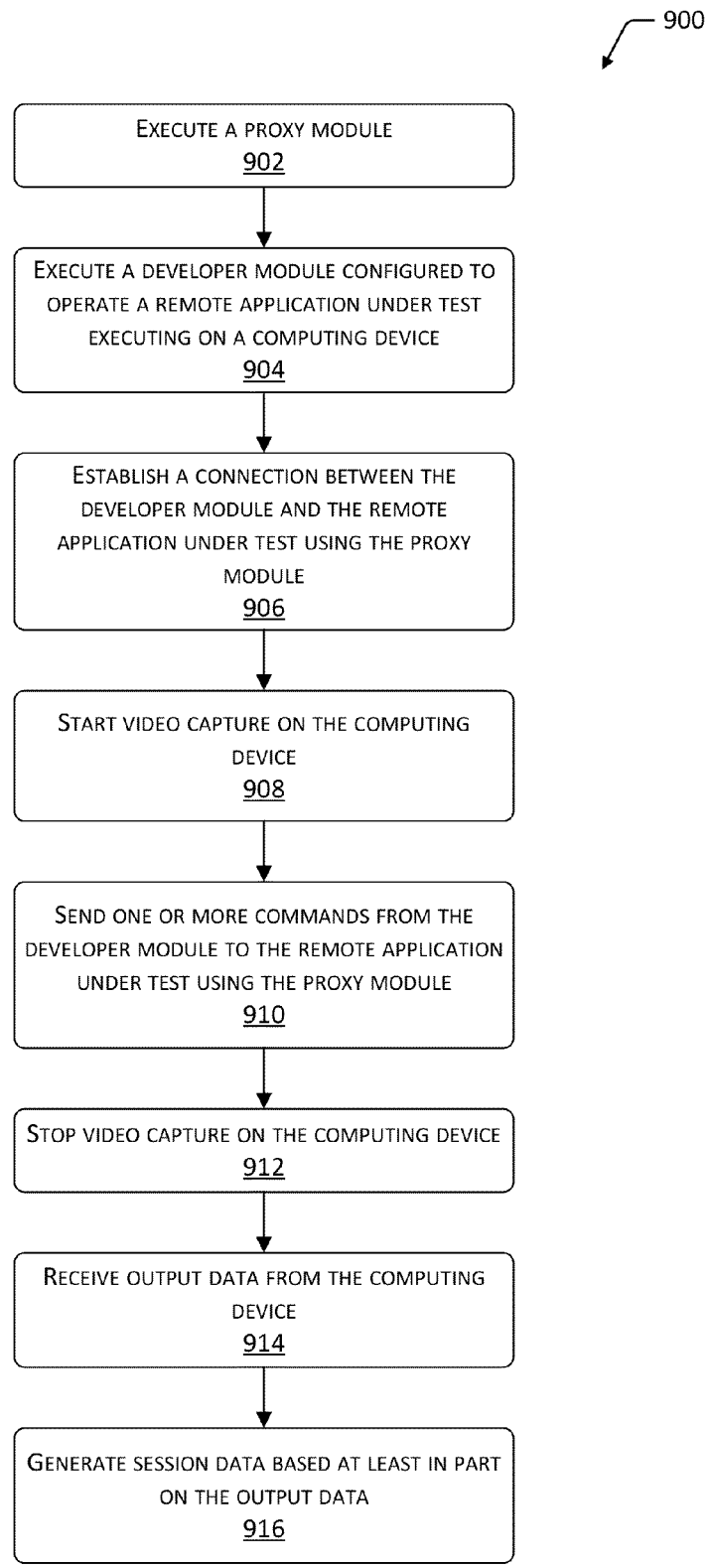
FIG. 9 depicts a flow diagram of debugging a markup language application using the proxy module.

FIG. 9 depicts a flow diagram 900 of debugging a markup language application 108 using the proxy module 142.

Block 902 executes a proxy module 142. As described in this disclosure, in one implementation the proxy module 142 may provide a first set of WebSockets and a second set of WebSockets, and allow transfer of data between the first and second sets.

Block 904 executes one or more developer modules 140. The developer modules 140 may be configured to operate in remote application under test 124 which executes on the computing device 116.

Block 906 establishes a connection between the developer module 140 and the remote application under test 124 using the proxy module 142. For example, the debug module 148 may establish a WebSockets connection with the first set of WebSockets provided by the proxy module 142.

Block 908 starts video capture on the computing device 116. For example, a video capture application executing on the computing device 116 may be executed. The video capture may be implemented as described in U.S. patent application Ser. No. 13/619,867, filed on Sep. 14, 2012, titled "Remote Control of a Mobile Device" to Manish Lachwani, et al. which has been incorporated by reference into this disclosure.

Block 910 sends one or more commands 110 from the developer module 140 to the remote application under test 124 using the proxy module 142. As described above, in some implementations the driver module 144 may be used to convert at least a portion of the commands 110 from a first form to a second form, wherein the second form is operable with regard to the remote application under test 124, or one or more modules executing on the computing device 16.

Block 912 stops video capture on the computing device. For example, the video capture application may be terminated or suspended.

Block 914 receives output data 112 from the computing device 116. For example, the layout engine module 126 may provide output data 112 from the com.apple.webinspectord daemon.

Block 916 generates session data 114 based at least in part on the output data 112. For example, the session data 114 may comprise a JSON file.

Illustrative Code

For illustration, and not by way of limitation, the following examples of illustrative code are provided.

Code Sample 1: Proxy module 142 establishes communication with computing device 116 and sets up web inspector.

```
// get phone
if (IDEVICE_E_SUCCESS != idevice_new(&phone, device_id)) {
    perror("No iPhone found, is it plugged in?");
    goto cleanup;
}
// connect to lockdownd
if (LOCKDOWN_E_SUCCESS !=
lockdownd_client_new_with_handshake(
        phone, &client, "Chrome_iOS_webkit_inspector")) {
    printf("Could not connect to lockdownd. Exiting.");
    goto cleanup;
}
// connect to webinspector
if (idevice_connect(phone, service->port, &Connection)) {
    printf("idevice_connect failed!");
    goto cleanup;
}
// start webinspector, get port
if ( (lockdownd_start_service(client,
"com.apple.webinspector", &service) !=LOCKDOWN_E_SUCCESS)
||
    !service) }
    printf("Could not start com.apple.webinspector!");
    goto cleanup;
}
```

Code Sample 2: Proxy module 142 disconnects from web inspector executing on the computing device 116.

```
// disconnect
idevice_disconnect(connection);
free(connection);
lockdownd_client_free(client);
idevice_free(phone);
```

WebSocket OPCODES supported by the proxy module 142:

| #defineOP_CODE_CONTINUATION | 0x0 |
| #defineOP_CODE_TEXT | 0x1 |
| #defineOP_CODE_BINARY | 0x2 |
| #defineOP_CODE_CLOSE | 0x8 |
| #defineOP_CODE_PING | 0x9 |
| #defineOP_CODE_PONG | 0xA |

Code Sample 3: Defining the WebSocket structure which includes API and callbacks.

```
struct websocket_struct {
//
// Use these APIs:
```

```
//
    websocket_status (*on_recv)(websocket_t self, const char
*buf, ssize_t length);
    websocket_status (*send_connect)(websocket_t self,
        const char *resource, const char *protocol,
        const char *host, const char *origin);
websocket_status (*send_upgrade)(websocket_t self);
websocket_status (*send_frame)(websocket_t self,
    bool is_fin, websocket_opcode opcode, bool
is_masking,
        const char *payload_data, size_t payload_length);
    websocket_status (*send_close)(websocket_t self,
websocket_close close_code,
        const char *reason);
    void *state;
    bool *is_debug;
    //
    // Set these callbacks:
    //
    websocket_status (*send_data) (websocket_t self,
        const char *data, size_t length);
    websocket_status (*on_http_request)(websocket_t self,
        const char *method, const char *resource, const
char *version,
        const char *headers, size_t headers_length,
        bool is_websocket, bool *to_keep_alive);
    websocket_status (*on_upgrade)(websocket_t self,
        const char *resource, const char *protocol,
        int version, const char *sec_key);
    websocket_status (*on_frame)(websocket_t self,
        bool is_fin, websocket_opcode opcode, bool
is_masking,
        const char *payload_data, size_t payload_length,
        bool *to_keep);
    // For internal private use only:
    websocket_status (*on_error)(websocket_t self, const char
*format, ...);
    websocket_private_t private_state;
};
// Create a webinspector connection.
//
// @param deviceid iOS 40-character device id, or NULL for
any device
// @param to_deviceid selected device_id (copy of device_id
if set)
// @param to_devicename selected device name
// @param recv_timeout Set the socket receive timeout for
future receive calls:
// negative for non-blocking,
// zero for the system default (5000 millis), or
// positive for milliseconds.
// @result fd, or -1 for error
int webinspector_connect(const char *deviceid, char
**to_deviceid,
        char **to_devicename, int recv_timeout);
struct webinspector_app_struct {
    char *app_id;
    char *app_name;
};
bool is_proxy;
typedef struct webinspector_app_struct *webinspector_app_t;
struct webinspector_page_structf
    uint32_t page_id;
    char *connection_id;
    char *title;
    char *url;
};
typedef struct webinspector_page_struct
*webinspector_page_t;
```

Code Sample 4: iOS® webinspector struct which defines API and callbacks

```
// iOS WebInspector.
struct webinspector_struct {
    //
    // Use these APIs:
    //
    webinspector_status (*on_recv)(webinspector_t self,
const char *buf, size_t length);
    webinspector_status
(*send_reportIdentifier)(webinspector_t self,
        const char *connection_id);
    webinspector_status
(*send_getConnectedApplications)(webinspector_t self,
        const char *connection_id);
    webinspector_status
(*send_forwardGetListing)(webinspector_t self,
        const char *connection_id, const char *app_id);
    webinspector_status
(*send_forwardIndicateWebView)(webinspector_t self,
        const char *connection_id, const char *app_id,
        uint32_t page_id, bool is_enabled);
    webinspector_status
(*send_forwardSocketSetup) (webinspector_t self,
        const char *connection_id, const char *app_id,
        uint32_t page_id, const char *sender_id);
    webinspector_status
(*send_forwardSocketData)(webinspector_t self,
        const char *connection_id, const char *app_id,
        uint32_t page_id, const char *sender_id,
        const char *data, size_t length);
    webinspector_status
(*send_forwardDidClose)(webinspector_t self,
        const char *connection_id, const char *app_id,
        uint32_t page_id, const char *sender_id);
    void *state;
    bool *is_debug;
    //
    // Set these callbacks:
    //
    webinspector_status (*send_packet)(webinspector_t self,
const char *packet, size_t length);
    webinspector_status (*on_reportSetup)(webinspector_t
self);
    webinspector_status
(*on_reportConnectedApplicationList)(webinspector_t self,
        const webinspector_app_t *apps);
    webinspector_status
(*on_applicationConnected) (webinspector_t self,
        const webinspector_app_t app);
    webinspector_status
(*on_applicationDisconnected)(webinspector_t self,
        const webinspector_app_t app);
    webinspector_status
(*on_applicationSentListing)(webinspector_t self,
        const char *app_id, const webinspector_page_t
*pages);
    webinspector_status
(*on_applicationSentData)(webinspector_t self,
        const char *app_id, const char *dest_id,
        const char *data, size_t length);
    // For internal use only:
    webinspector_status (*on_error) (webinspector_t self,
const char *format, ...);
    webinspector_private_t private_state;
```

Proxy module 142 (Chrome_iOS_webkit_inspector) exemplary command line options:

```
# Chrome_iOS_webkit_inspector -h
Usage: Chrome_iOS_webkit_inspector [OPTIONS]
iOS WebKit Remote Debugging Protocol Proxy.
    -c, --config CSV    [UDID]:port[-port]config(s),
defaults to:
        null:9221,:9222-9322
        which will list devices on port 9221 and assign
        all other devices (":") to the next unused port in
the
        9222-9322 range.
        E.g. to track a single device with a specific port:
            5ee0e410c6c6ac2de1a8475fc270afea197bbe40:9223
        The value can be the path to a file in the above
format.
```

```
-f,--frontend URL    Developer Tools frontend UI path or
URL, defaults to:
        http://chrome-devtools-
frontend.appspot.com/static/18.0.1025.74/devtools.html
    E.g. to use a local WebKit checkout:
            /usr/local/WebCore/inspector/front-
end/inspector.html
        E.g. to use a remote server:
            http://foo.com:1234/bar/inspector.html
        The value must end in ".html"
--no-frontend    Disable the Developer Tools frontend.
-d,--debug    Enable debug output.
-h,--help    Print this usage information.
```

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A system comprising:
   at least one processor;
   at least one memory coupled to the at least one processor and storing instructions that, when executed on the at least one processor, cause the system to perform functions comprising:
   receiving one or more first-form commands in a first form which is compliant with a remote debugging protocol and wherein the first form is incompatible with a layout engine;
   converting the one or more first-form commands to one or more second-form commands in a second form, wherein the second form is compatible with at least a portion of the layout engine, and wherein the layout engine is configured to execute a markup language application that includes one or more instructions expressed in a markup language;
   providing the one or more second-form commands compatible with the layout engine; and
   after providing the one or more second-form commands, receiving output data resulting from execution of the markup language application by the layout engine.

2. The system of claim 1, wherein the markup language comprises a hypertext markup language ("HTML").

3. The system of claim 1, wherein the functions further comprise:
   transferring data using the system, wherein the data comprises one or more of: at least one of the one or more first-form commands, at least one of the one or more second-form commands, and at least a portion of the output data.

4. The system of claim 1, wherein at least one first-form command of the one or more first-form commands is configured to clear a browser cache associated with the layout engine.

5. The system of claim 1 wherein the functions further comprise:
   providing session data related to the one or more first-form commands.

6. The system of claim 1, wherein:
   the layout engine comprises one or more embedded test tools providing functionality for testing the layout engine; and
   the remote debugging protocol is compliant with a predetermined remote debugging protocol.

7. The system of claim 1, further wherein the layout engine is configured to operate within an operating system having a secured configuration.

8. The system of claim 1, wherein the layout engine comprises one or more embedded test tools providing functionality for testing the layout engine, and wherein the one or more second-form commands comprises a second-form command that is compatible with the one or more embedded test tools.

9. The system of claim 1, wherein:
   the one or more commands in the first form, the second form, or both are included in an automated test script.

10. A computer-implemented method, comprising:
    receiving one or more first-form commands in an first form that is compliant with a remote debugging protocol and wherein the first form is incompatible with a layout engine;
    converting the one or more first-form commands to one or more second-form commands in a second form, wherein the second form is compatible with at least a portion of the layout engine, and wherein the one or more second-form commands are configured to control at least a portion of execution of a remote application under test executing on a computing device, wherein the remote application under test is expressed at least in part using a markup language;

establishing communication using a set of one or more ports;

providing the one or more second-form commands using the set of one or more ports; and after providing the one or more second-form commands receiving output data resulting from execution of the remote application under test using the set of one or more ports.

11. The method of claim 10, wherein at least a portion of the one or more second-form commands specify a network address indicative of a location from which to retrieve at least a portion of the remote application under test, the remote application under test comprising one or more web pages.

12. The method of claim 10, wherein the one or more second-form commands comprises a second-form command that is compatible with one or more embedded test tools.

13. The method of claim 12, wherein the one or more embedded test tools provide functionality for testing a layout engine that is configured to render the markup language.

14. The method of claim 10, wherein at least one port set of one or more ports are compliant with a predetermined communication protocol.

15. The method of claim 10, wherein establishing communication using the set of ports comprises:

initiating a connection via a universal serial bus.

16. A method, comprising:

receiving one or more first-form commands expressed in a first form at a computing device, wherein the first form is compliant with a remote debugging protocol, and wherein the first form is incompatible with a layout engine;

converting the one or more first-form commands to one or more second-form commands in a second form using the computing device, wherein the second form is compatible with at least a portion of the layout engine, and wherein the layout engine is configured to execute a markup language application that includes one or more instructions expressed in a markup language;

providing the one or more second-form commands second form to the first layout engine; and after providing the one or more second-form commands, receiving output data resulting from execution of the markup language application by the layout engine.

17. The method of claim 16, wherein the one or more commands in the first form, the second form, or both are included in an automated test script data.

18. The method of claim 16, wherein:

the layout engine comprises one or more embedded test tools providing functionality for testing the layout engine.

19. The method of claim 16, wherein the application comprises one or more web pages and the one or more first-form commands comprise at least one command configured to designate a network address associated with assess one or more web pages.

20. The method of claim 16, wherein providing the command in the second form of the command comprises establishing communication with the external computing device using a set of one or more ports; and sending the second form of the command to the external computing device using the set of one or more ports.

* * * * *